United States Patent [19]

Romike et al.

[11] Patent Number: 4,542,862
[45] Date of Patent: Sep. 24, 1985

[54] HAND HELD TROTLINE REEL

[76] Inventors: Robert G. Romike; Vernon H. Byrd, both of 8726 Dexter, Houston, Tex. 77075

[21] Appl. No.: 577,067

[22] Filed: Feb. 6, 1984

[51] Int. Cl.[4] .................................. 242 96; 242 84.2 R; 242 118.4; 242 118.61; 43 57.3
[52] U.S. Cl. .................................. 242/96; 43/57.3; 242/84.2 R; 242/118.4
[58] Field of Search .................................. 1/15

[56] References Cited

U.S. PATENT DOCUMENTS

| | | | |
|---|---|---|---|
| 1,405,546 | 2/1922 | Nelson | 43/57.3 |
| 2,041,322 | 5/1936 | Cantini | 43/57.3 X |
| 2,629,197 | 2/1953 | Duvall | 43/57.3 |
| 3,022,601 | 2/1962 | Martin | 43/57.3 |
| 3,486,267 | 12/1969 | Hitre | 43/57.3 |
| 3,589,640 | 6/1971 | Mapes | 242/118.4 X |
| 3,660,924 | 5/1972 | McGee, Jr. | 43/57.3 |
| 3,775,893 | 12/1973 | McGee, Jr. | 43/57.3 |
| 4,091,559 | 5/1978 | Easley | 242/96 X |

FOREIGN PATENT DOCUMENTS 235297 3/1924 United Kingdom ............ 242/118.4

Primary Examiner—Stuart S. Levy
Assistant Examiner—Lynn Sohacki
Attorney, Agent, or Firm—Neal J. Mosely

[57] ABSTRACT

A hand held trotline reel comprises a reel having end flanges with a hollow cylindrical ribbed hub therebetween for receiving the main line of a trotline and a plate member disposed between the flanges of the reel having a series of equally-spaced, radially-extending slots for receiving and retaining the fishhooks from the side line of the trotline. The plate member is spaced near one flange sufficiently to provide protection to the user against injury from the hooks. The reel is easily operated reel and unreel a trotline while keeping the fishhooks separated and free from tangling or twisting.

15 Claims, 6 Drawing Figures

HAND HELD TROTLINE REEL

BACKGROUND OF THE INVENTION

1. Field of the Invention

This invention relates to fishline handling devices, and more particularly to a hand held trotline reel of novel construction.

2. Brief Description of the Prior Art

A trotline is a fishing line consisting of a single main line with a series of side lines secured thereon with hooks secured on the end of each side line. Trotlines are difficult to reel and unreel without tangling or twisting the side lines and hooks. There is a substantial demand for a trotline reel which is capable of reeling and unreeling a trotline without tangling or twisting the side lines and hooks.

Trotline reels are known in the art. There are several patents which disclose various trotline reel devices. Most of these reels have a number of disadvantages which have kept them from being used extensively.

Nelson, U.S. Pat. No. 1,405,546 discloses a trotline reel comprising a drum having a portion for receiving the main line of a trotline, and an adjoining longitudinally extended portion to receive the leaders. The extended portion is provided with a series of catches to receive the hooks.

Duvall, U.S. Pat. No. 2,629,197 discloses a fishing reel comprising a drum supported by a yoke connectable to a boat or other support. Each end of the drum is provided with a first flange having a notched periphery for receiving a leader line, and an adjacent secondary flange having a smooth periphery. A continuous coiled spring is disposed between each pair of flanges. The spring releasably holds the rounded ends of the hooks.

Martin, U.S. Pat. No. 3,022,601 discloses a trotline reel comprising a drum having end flanges mounted on a shaft. A disc having spaced blades for receiving the leaders and a disc having a plurality of notches or serrations for retaining hooks are mounted on the same shaft. The hook retaining disc is provided with a pawl and ratchet mechanism to control tension on the trotline and leader line. The structure is mounted on a boat and the trotline unwound therefrom by rowing or motoring the boat across the water.

Hitre, U.S. Pat. No. 3,486,267 discloses a set line drum rotatable on a base plate. The drum comprises a cylinder having one end closed and its other end provided with circumferentially spaced open ended slots in its cylindrical wall for removably securing leader lines. The hooks may be baited while suspended within the drum.

McGee, Jr., U.S. Pat. No. 3,660,924 discloses a trotline container and dispenser which includes a reel, and a series of hook retaining compartments carried outside one of the reel flanges. The compartments are adapted to hold baited hooks. The reel is rotatably mounted on a spindle which may be attached to a boat.

McGee, Jr., U.S. Pat. No. 3,775,893 discloses a fixed trotline dispenser or spool having a recessed reel section for receiving a trotline wound thereupon, and a series of hook retaining compartments positioned on one end of the spool and opening longitudinally of the spool for releasably retaining either baited or unbaited fishhooks of the trotline.

Easley, U.S. Pat. No. 4,091,559 discloses a trotline reel comprising a spool rotatably mounted on a shaft. One of the flanges of the spool is slotted to receive the leader portion of the trotline. A slotted hook retaining disc having a layer of resilient material thereon is secured to the shaft at a distance from the slotted flange. The leader extends through the slotted flange and the shank of the hook extends through the slotted disc with the pointed end of the hook secured in the resilient material.

The prior art in general, and none of these patents in particular, disclose a hand held trotline reel which can wind and store a trotline without tangling or twisting the hooks and side lines and unwind a trotline and feed it out smoothly from the reel.

SUMMARY OF THE INVENTION

It is therefore an object of the present invention to provide a trotline reel whereby a trotline may be easily and safely set out, retrieved, and stored.

Another object of this invention is to provide a trotline reel which eliminates the need to remove hooks and leaders from the main line of the trotline.

Another object of this invention is to provide a trotline reel which reduces tangling of the lines and hooks.

Another object of this invention is to provide a trotline reel having means to secure the pointed ends of the hooks away from the trotline, hands, and fingers.

Another object of this invention is to provide a trotline reel having maximum ventilation for fast drying time of hooks and lines.

Another object of this invention is to provide a trotline reel which may be operated easily by right or left handed users.

Another object of this invention is to provide a trotline reel of simple, lightweight, rugged, and durable construction.

Other objects of the invention will become apparent from time to time throughout the specification and claims as hereinafter related.

The above noted objects and other objects of the invention are accomplished by a hand held trotline reel which has end flanges with a hollow cylindrical ribbed hub therebetween for receiving the main line of a trotline and a plate member disposed between the flanges of the reel having a series of equally-spaced, radially-extending slots for receiving and retaining the fishhooks from the side line of the trotline. The plate member is spaced near one flange sufficiently to provide protection to the user against injury from the hooks. The reel is easily operated reel and unreel a trotline while keeping the fishhooks separated and free from tangling or twisting.

DESCRIPTION OF THE PREFERRED EMBODIMENT

Figure 1:
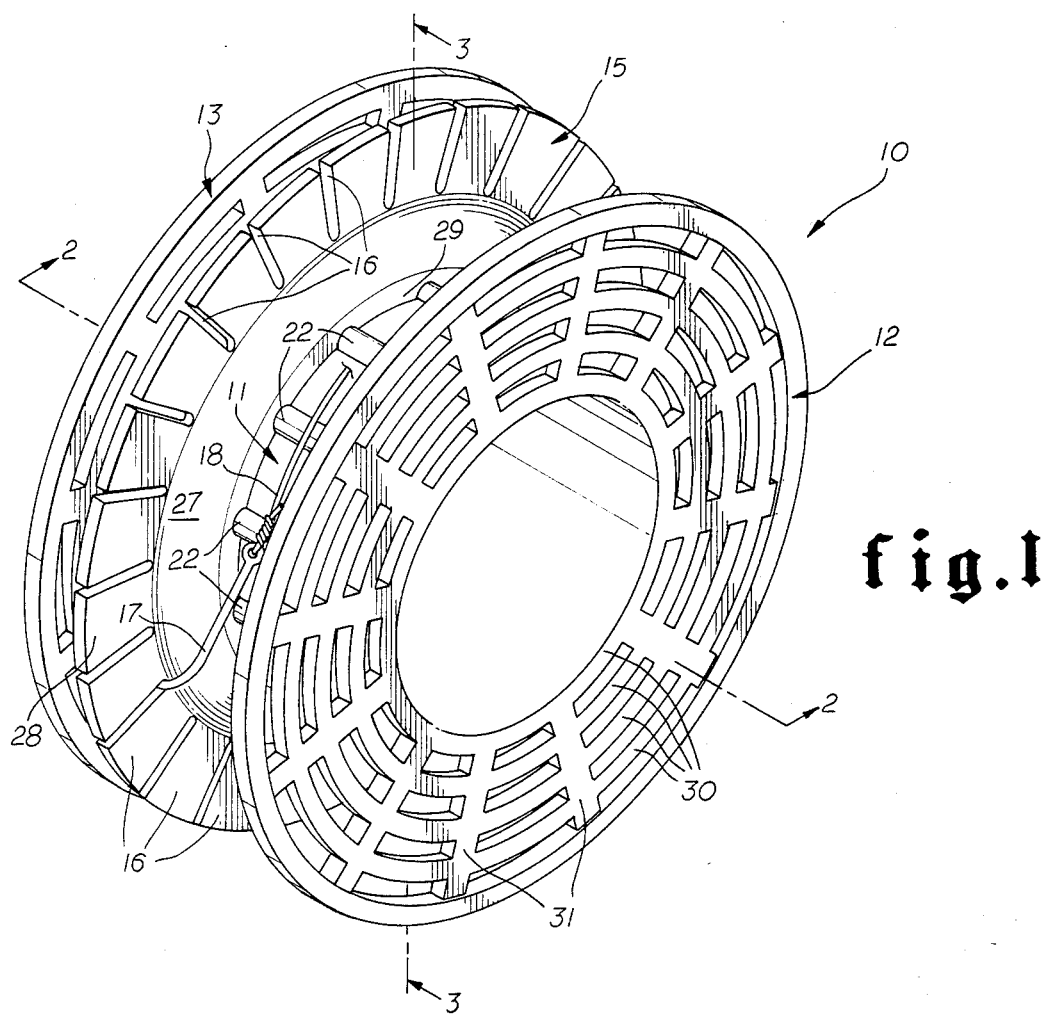
FIG. 1 is an isometric view of the hand held trotline reel in accordance with the present invention.
Figure 2:
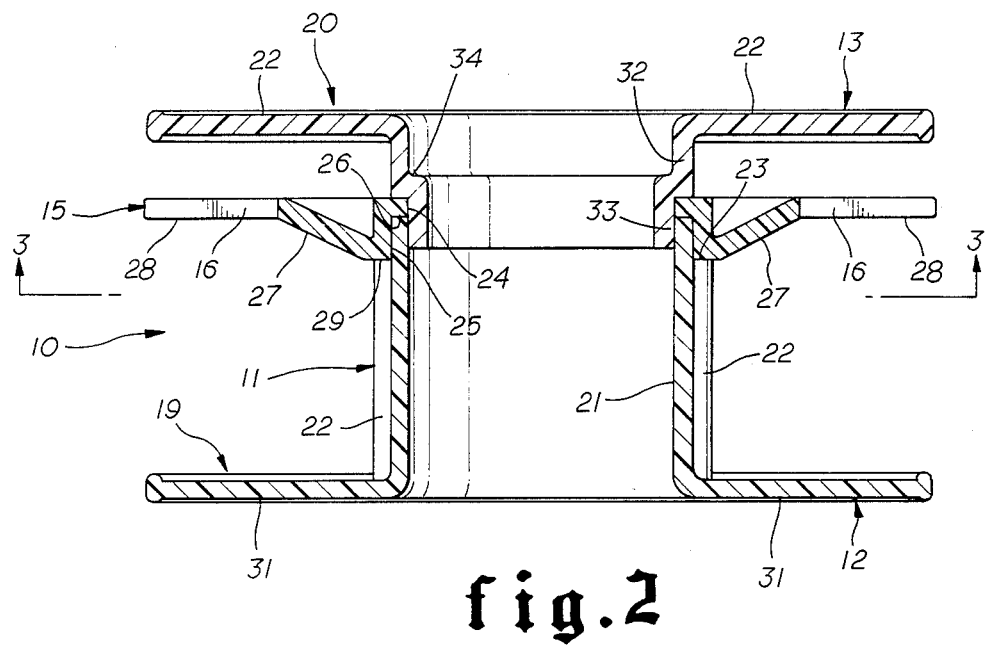
FIG. 2 is a longitudinal cross section view of the hand held trotline reel taken along line 2—2 of FIG. 1.
Figure 3:
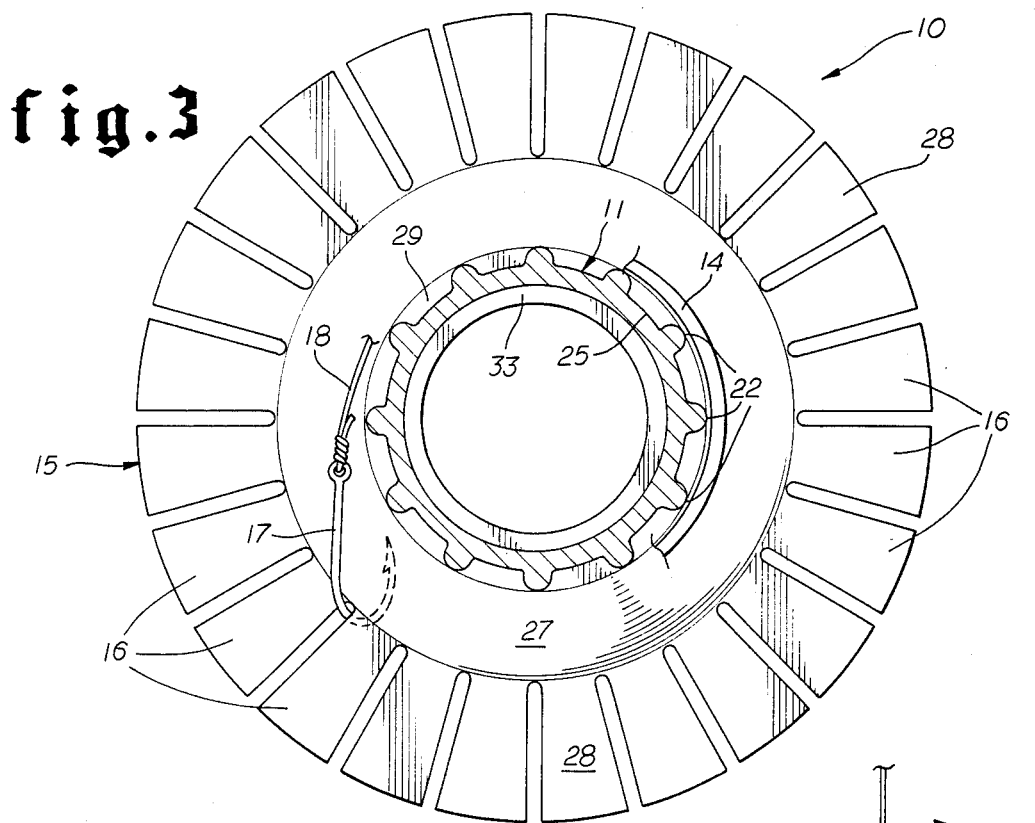
FIG. 3 is a horizontal cross section view of the trotline reel taken along line 3—3 of FIG. 2.

Referring to the drawings by numerals of reference, and more particularly to FIGS. 1, 2, and 3, there is shown a preferred hand held trotline reel 10. The reel 10 comprises a hollow cylindrical hub 11 having flanges 12 and 13 at each end thereof. The hub 11 receives the main line 14 (FIGS. 3–6) of a trotline. A generally disc shaped plate member 15 is secured on hub 11 between the flanges 12 and 13. Plate member 15 has a plurality of equally-spaced, radially-extending slots 16 for receiving and retaining the fishhooks 17 from the side line or leader line 18 of the trotline. Plate member 15 is spaced near the flange 13 at a distance sufficiently close to provide protection to the user against injury from the hooks 17.

The reel 10 is formed in two sections 19 and 20 which are preferably of molded plastic or the like. Flange 12 and hub 11 are molded in a single piece which comprises reel section 19. The hollow cylindrical hub 11 is hollow as indicated at 21 and provided with spaced, parallel ribs 22 which allow air circulation for drying of the trotline wound thereon. The ribs 22 extend from the flange 12 and terminate a short distance from the end of the hub 11 to define a plurality of shoulders 23 thereon.

The disc shape plate 15 has a central opening 24 of the same diameter as the internal diameter of the hub 11 and a concentric, slightly larger counterbore 25 to define a radial shoulder 26 therebetween. An angularly inclined, i.e. conical, portion 27 extends radially from the counterbore 25 and terminates in a flat planar portion 28 at a fixed distance from the periphery of the plate 15. A flat radial shoulder 29 is a provided at the juncture of the counterbore 25 and the inclined portion 27.

The flanges 12 and 13 are of generally open web construction defined by a series of concentric rings 30 and radially extending spokes 31. The open construction of the flanges 12 and 13 provides reduced weight and allows air circulation to further facilitate drying of the trotline wound to the reel 10.

Reel section 20 comprises flange 13 which has a short hollow cylindrical hub portion 32 and a reduced diameter extended neck portion 33 defining a flat radial shoulder 34 therebetween. The outer diameter of the extended neck 33 is sized for a press fit between it in the bore 21 of the hub 11, and the opening 24 of the plate 15.

The reel 10 is formed in three separate molded pieces as described above. While the reel could be made in a one-piece molded construction, the cost would be prohibitive. In assembly, the plate 15 is installed on the hub 11 with the inclined surface 27 facing the flange 12. The shoulder 29 rests on the several shoulders 23 formed by the ends of the ribs 20 and the shoulder 26 rests on the end of the hub 11. The extended neck portion 33 of the flange 13 is inserted into the open end of the hub 11 and pressed into place with the shoulder 34 resting on the backside of the plate 15 to lock the assembled reel 10 together as one integral unit. A suitable bonding agent or adhesive may be applied to the interfitting parts during assembly to produce a permanently bonded integral unit.

OPERATION

Figure 4:
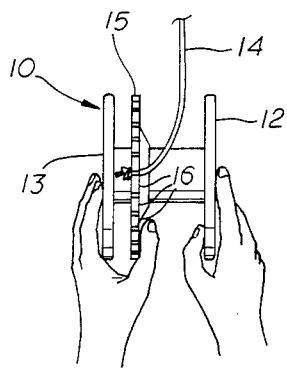
FIGS. 4, 5, and 6 are small views in end elevation illustrating how the trotline is used.
Figure 5:
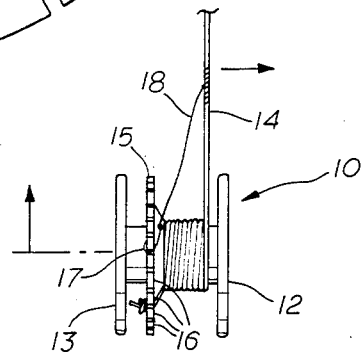
Figure 6:
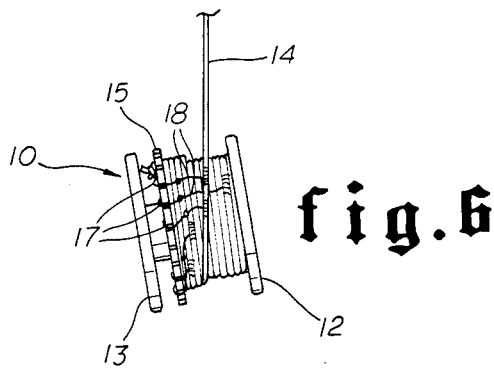

Referring now to FIGS. 4, 5, and 6, the use of the hand held trotline reel 10 will be explained. The reel 10 may be used by either right or left handed users. A right handed user would hold the reel 10 between his hands with the plate 15 to the left side. A left handed user would hold the reel 10 with the plate 15 to the right hand side. The following procedure assumes that the user is right handed.

First, tie a knot in the end of the main line 14 and place the knotted end into a slot 16 (FIGS. 4 and 5). Wind the main line 14 on the reel 10 until the first leader line 18 is about one foot from the center of the reel 10. Second, hold the reel 10 in the left hand, and take the hook 17 in the right hand and pull it toward the reel until the leader line 18 is tight. Place the hook 17 in any slot 16 that is from center to forward of center of the hub 11. The hook 17 need only be ¼" deep in the slot 16 (FIG. 5).

Next, have the main line 14 centered or to the right of center and wind in the main line 14 until the leader line 18 is on the hub 11, then wind the main line 14 evenly across the hub 11 reaching the next leader line 18. Repeat step 2 until all hooks are in place, and wind the remaining line on the hub. Tie a knot in the remaining end, and place it in a slot. Finally, to set out the trotline, tie the main line 14 off and hold the reel at a slight angle as shown in FIG. 6. Allow the line to spool off the reel, and the hooks will come out of the slots automatically.

This reel is constructed so that the trotline can be wound and unwound, i.e. reeled and unreeled, with the fishhooks and leaded lines kept seperate and free from twisting or tangling. The inclined wall, i.e. conical wall, portion 27 allows the main line 14 to be wound close to the base of plate 15 without the base of the fishhooks 17 becoming wedged in and thus being difficult to unreel as is the case in most of the prior art trotline reels.

While this invention has been described fully and completely with special emphasis upon a preferred embodiment, it should be understood that within the scope of the appended claims the invention may be practiced otherwise than is specifically described herein.

We claim:

1. A reversible hand held trotline reel for receiving a trotline comprising a main line having a series of hook carrying leaders sequentially positioned thereon, said reel comprising:
   a hollow cylindrical hub, having a central opening, open on both ends permitting the hub to be held and rotated on one's hand and for receiving a trotline wound thereon,
   opposing flange members secured on each end of said hub,
   a generally disc shaped plate member secured on said hub and having hook retaining means comprising a plurality of equally spaced radially extending slots therein for receiving and releasably retaining the hook portions of the fishhooks of the trotline, and
   said plate being positioned between said flanges and adjacent one flange and spaced a distance therefrom sufficiently close to prevent insertion of the fingers therebetween, thus providing protection to the user against injury from the hooks.

2. A trotline reel according to claim 1 in which said plate member has an angularly inclined portion extending radially from said hub and terminating in a flat portion at a predetermined distance from the periphery thereof, said slots being located in said flat portion of said plate member.

3. A trotline reel according to claim 1 in which said hub has a plurality of equally spaced longitudinally extending ribs thereon extending from said plate member to the opposite flange member.

4. A trotline reel according to claim 1 in which said flanges are each of flat planar shape comprising a plurality of concentric arcuate sections joined by a plurality of radially extending spokes.

5. A trotline reel according to claim 1 in which said hub, flanges, and plate member are molded of thermoplastic material.

6. A trotline reel according to claim 5 in which said hub, flanges, and plate member are molded in a single piece construction.

7. A trotline reel according to claim 5 in which said hub and flanges are molded in two pieces and said plate member is molded as a separate piece and assembled therebetween.

8. A reversible hand-held trotline reel with trotline wound thereon comprising
   a hollow cylindrical hub, having a central opening, open on both ends permitting the hub to be held and rotated on one's hand and with opposing flat planar flange members secured on opposite ends thereof,
   a generally disc shaped plate member secured on said hub and having hook retaining means comprising a plurality of equally-spaced radially-extending slots therein for receiving and retaining portions of the fishhooks of the trotline,
   said plate being positioned between said flanges and adjacent one flange and spaced a distance therefrom sufficiently close to prevent insertion of the fingers therebetween, thus providing protection to the user against injury from the hooks, and
   a trotline wound on said reel comprising a main line having a series of hook carrying leaders sequentially positioned thereon with said main line wound on said hub and said hooks separated by and secured on said hook retaining means with the hook portions of the fishhooks secured in said radially extending slots.

9. A reel and trotline wound thereon according to claim 8 in which
   said plate member has an angularly inclined portion extending radially from said hub and terminating in a flat portion at a predetermined distance from the periphery thereof, said slots being located in said flat portion of said plate member.

10. A reel and trotline wound thereon according to claim 8 in which
    said hub is hollow and has a plurality of equally spaced longitudinally extending ribs thereon extending from said plate member to the opposite flange member.

11. A reel and trotline wound thereon according to claim 8 in which
    said flanges are each of flat planar shape comprising a plurality of concentric arcuate sections joined by a plurality of radially extending spokes.

12. A reel and trotline wound thereon according to claim 8 in which
    said plate member has an angularly inclined portion extending radially from said hub and terminating in a flat portion at a predetermined distance from the periphery thereof,
    said hub is hollow and has a plurality of equally spaced longitudinally extending ribs thereon,
    said hook retaining means comprises equally spaced radially extending slots in said flat portion of said plate member in which said hooks are positioned, and
    said flanges are each of flat planar shape comprising a plurality of concentric arcuate sections joined by a plurality of radially extending spokes.

13. A reel and trotline wound thereon according to claim 8 in which
    said hub, flanges, and plate member are molded of thermoplastic material.

14. A reel and trotline wound thereon according to claim 13 in which
    said hub, flanges, and plate member are molded in a single piece construction.

15. A reel and trotline wound thereon according to claim 13 in which
    said hub and flanges are molded in two pieces and said plate member is molded as a separate piece and assembled therebetween.

* * * * *